United States Patent
Parks

(10) Patent No.: US 12,201,128 B2
(45) Date of Patent: Jan. 21, 2025

(54) PALM-BASED ANIMAL FEED

(71) Applicant: Palm Silage, Inc., Fountain Valley, CA (US)

(72) Inventor: James Clifford Parks, Thermal, CA (US)

(73) Assignee: Palm Silage, Inc., Fountain Valley, CA (US)

( * ) Notice: Subject to any disclaimer, the term of this patent is extended or adjusted under 35 U.S.C. 154(b) by 485 days.

(21) Appl. No.: 17/384,580

(22) Filed: Jul. 23, 2021

(65) Prior Publication Data

US 2022/0183321 A1    Jun. 16, 2022

Related U.S. Application Data

(63) Continuation of application No. 14/769,058, filed as application No. PCT/US2014/017207 on Feb. 19,
(Continued)

(51) Int. Cl.
*A23K 10/37*      (2016.01)
*A23K 10/30*      (2016.01)
(Continued)

(52) U.S. Cl.
CPC .............. *A23K 10/37* (2016.05); *A23K 10/30* (2016.05); *A23K 40/20* (2016.05); *A23K 40/25* (2016.05);
(Continued)

(58) Field of Classification Search
CPC ........ A23K 10/37; A23K 40/20; A23K 40/25; A23K 50/10; A23K 50/15; A23K 10/30; Y02P 60/87
(Continued)

(56) References Cited

U.S. PATENT DOCUMENTS

| | | | |
|---|---|---|---|
| 536,781 | A | 4/1895 | Draver et al. |
| 3,600,188 | A | 8/1971 | Wilding et al. |

(Continued)

FOREIGN PATENT DOCUMENTS

| | | |
|---|---|---|
| CA | 2319978 A1 | 3/2002 |
| CN | 201667968 U | 12/2010 |

(Continued)

OTHER PUBLICATIONS

Abdelbasset, El Hadrami et al., Emir. J. Food Agric. 2012. 24 (5): 371-385.

(Continued)

*Primary Examiner* — Brent T O'Hern
(74) *Attorney, Agent, or Firm* — Knobbe Martens Olson & Bear, LLP

(57) ABSTRACT

Animal feed formed with a base of palm fronds and combined with palm fruit, such as dates, is a sustainable and affordable feed product that can be developed in hot climates. Palm fronds with a desired moisture content are shredded, chopped, and/or ground, and mixed with palm fruit. Additives such as urea can increase the nutritional content. Feeds with palm fronds, palm fruit, and/or additives can serve as a base feed for other components. Palm fronds can also serve as a base feed for other components. Animal feeds with a variety of bases can have palm fruit added. Animal feeds with a variety of bases, including palm fronds, can include a variety of other components added.

20 Claims, 10 Drawing Sheets

Related U.S. Application Data 2014, now Pat. No. 11,071,313, which is a continuation-in-part of application No. 13/794,686, filed on Mar. 11, 2013, now Pat. No. 11,064,717.

(60) Provisional application No. 61/775,435, filed on Mar. 8, 2013, provisional application No. 61/767,165, filed on Feb. 20, 2013.

(51) Int. Cl.
*A23K 40/20* (2016.01)
*A23K 40/25* (2016.01)
*A23K 50/10* (2016.01)
*A23K 50/15* (2016.01)

(52) U.S. Cl.
CPC .............. *A23K 50/10* (2016.05); *A23K 50/15* (2016.05); *Y02P 60/87* (2015.11)

(58) Field of Classification Search
USPC ........................................................ 426/635
See application file for complete search history.

(56) References Cited

U.S. PATENT DOCUMENTS

| | | |
|---|---|---|
| 4,363,448 A | 12/1982 | Machler et al. |
| 4,428,969 A | 1/1984 | Müller et al. |
| 4,460,292 A | 7/1984 | Durham |
| 4,578,275 A | 3/1986 | Spanier |
| 4,680,190 A | 7/1987 | Spiel |
| 5,120,565 A | 6/1992 | Lanter et al. |
| 5,236,717 A | 8/1993 | Vinci |
| 5,250,307 A | 10/1993 | Cummings |
| 5,540,932 A | 7/1996 | Lanter et al. |
| 5,683,739 A | 11/1997 | Lanter et al. |
| 5,855,943 A | 1/1999 | Lush et al. |
| 7,296,537 B2 | 11/2007 | Burghardi |
| 10,711,420 B2 | 7/2020 | Parks |
| 11,064,717 B2 | 7/2021 | Parks |
| 11,071,313 B2 | 7/2021 | Parks |
| 11,297,853 B2 | 4/2022 | Jimenez-Marquez et al. |
| 11,346,068 B2 | 5/2022 | Parks |
| 2006/0160907 A1 | 7/2006 | Stamp |
| 2007/0277739 A1 | 12/2007 | Wang et al. |
| 2008/0089998 A1 | 4/2008 | Chou |
| 2008/0146520 A1 | 6/2008 | Block et al. |
| 2008/0171297 A1 | 7/2008 | Reynolds |
| 2009/0062516 A1 | 3/2009 | Belanger et al. |
| 2010/0167351 A1 | 7/2010 | Eyal et al. |
| 2010/0233320 A1 | 9/2010 | Sunvold et al. |
| 2011/0297885 A1 | 12/2011 | Boerrigter et al. |
| 2012/0040029 A1 | 2/2012 | Sambanthamurthi et al. |
| 2012/0315339 A1 | 12/2012 | Duval et al. |
| 2013/0012610 A1 | 1/2013 | Belanger et al. |
| 2014/0234524 A1 | 8/2014 | Parks |
| 2016/0007630 A1 | 1/2016 | Parks |
| 2019/0048307 A1 | 2/2019 | Morash et al. |
| 2020/0156125 A1 | 5/2020 | Parks |
| 2021/0164182 A1 | 6/2021 | Parks |
| 2022/0174987 A1 | 6/2022 | Parks |

FOREIGN PATENT DOCUMENTS

| | | | |
|---|---|---|---|
| EP | 2342973 | 7/2011 | |
| EP | 2 546 352 | 1/2013 | |
| GB | 797763 A * | 7/1958 | |
| GB | 2 185 673 | 7/1987 | |
| GB | 2200027 A * | 7/1988 | ............. A23K 10/30 |
| GB | 2 257 012 | 1/1993 | |
| JP | 62-158457 | 7/1987 | |
| JP | 62-239957 | 10/1987 | |
| JP | 2002-51707 | 2/2002 | |
| WO | WO 1996/17525 | 6/1996 | |
| WO | WO 1997/33488 | 9/1997 | |
| WO | WO 1999/42422 | 8/1999 | |
| WO | WO 2004/039751 | 5/2004 | |
| WO | WO 2004/080197 | 9/2004 | |
| WO | WO 2007/100251 | 9/2007 | |
| WO | WO 2009/110782 | 9/2009 | |
| WO | WO 2010/056940 | 5/2010 | |
| WO | WO 2010/117255 | 10/2010 | |
| WO | WO 2012/050431 | 4/2012 | |
| WO | WO 2013/096698 | 6/2013 | |
| WO | WO 2014/130578 | 8/2014 | |
| WO | WO 2015/014497 | 2/2015 | |
| WO | WO 2018/175921 | 9/2018 | |

OTHER PUBLICATIONS

Al-Dobaib, S N et al., Effect of feeding discarded dates on milk yield and composition of Aradi goats, Small Ruminant Research, Elsevier, Amsterdam, NL, vol. 81, No. 2-3, Feb. 1, 2009.

Armcon Engineering downloaded from https://www.youtube.com/watch?v= J8omAdfMNs, 3 pages dated Feb. 9, 2007.

Barreveld, W.H., Date Palm Products, FAO Agricultural Services Bulletin No. 101, Food and Agricultur Organization of the United nations Rome 1993, in 16 pages.

Belal, Ibrahim E.H., et al., Evalutaion of date-feed ingredients mixes, Animal Feed Science and technology, 81 (1999) pp. 291-298.

Bengaly, K., et al., Utilization of Steam-processed Oil Palm (*Elaeis guineensis*) Frond by Ruminants in Malaysia: Investigations for nitrogen supplementation. African Journal of Agricultural Research, vol. 5 (16), pp. 2131-2136, 2010 in 6 pages.

Biofuel Co-Products as Livestock Feed, Opportunities and Challenges, Food and Agriculture Organization of the United Nations, Rome, 2012, Chapters 1-5 in 116 pages.

Biofuel Co-Products as Livestock Feed, Opportunities and Challenges, Food and Agriculture Organization of the United Nations, Rome, 2012, Chapters 6-11 in 123 pages.

Biofuel Co-Products as Livestock Feed, Opportunities and Challenges, Food and Agriculture Organization of the United Nations, Rome, 2012, Chapters 12-17 in 81 pages.

Biofuel Co-Products as Livestock Feed, Opportunities and Challenges, Food and Agriculture Organization of the United Nations, Rome, 2012, Chapters 18-24 in 133 pages.

Biofuel Co-Products as Livestock Feed, Opportunities and Challenges, Food and Agriculture Organization of the United Nations, Rome, 2012, Chapters 25-28 in 87 pages.

Bob's Red Mill: Date Powder, downloaded from www.lifestylemarkets.com, dated May 3, 2006, 2 pages.

Canampak Dates Industry (Pvt) Ltd., International Suppliers of Dates, All About Dates [online] (full content), Copyright 2009, [printed Jul. 9, 2014]. Retrieved from the Internet: <URL: http://www.canampakdates.com/about-dates.htm>.

Chandrasekaran et al. Saudi J. Biol. Sci. Apr. 2013, 20(2), pp. 105-120.

"Converting Waste Oil Palm Trees Into a Resource," United Nations Environment Programme, 2012 in 202 pages.

Dahlan, I., et al., Nutrient Intake and Digestibility of Fresh, Ensiled and Pelleted Oil Palm (*Elaeis guineensis*) Frond by Goats. Department of Animal Science, Faculty of Agriculture, Universiti Putra Malaysia, pp. 1407-1413, 2000 in 7 pages.

Dahlan, I., Oil Palm Frond, a Feed for Herbivores. Asian-Aus. J. anim. Sci. 13 Supplement, pp. 300-303, 2000 in 4 pages.

Devendra, C., et al.,—Invited Review—Feed Resources for Animals in Asia: Issues, Strategies for Use, Intensification and Integration for Increased Productivity. The Asian-Australasian Association of Animal Production Societies, vol. 24, No. 3, pp. 303-321, Mar. 2011 in 19 pages.

Devendra, C., Intensification of Integrated Oil Palm-ruminant Systems. Outlook on Agriculture, vol. 38, No. 1, pp. 71-81, 2009 in 11 pages.

Duran, A.O., 1998, The African palm: A strategic resource for integrated systems of tropical production. First FAO Electronic conference on tropical Feeds and Feeding Systems. FAO Animal Production and Health Paper, FAO, Rome, 13 pages.

(56) References Cited

OTHER PUBLICATIONS

Genin D., et al.. Valorisation of date-palm by-products (DPBP) for livestock feeding in Southern Tunisia. I—Potentialities and traditional utilisation. In : Ben Saem H. (ed.), Nefzaoui A. (ed), Morand-Fehr P. (ed). Nutrition and feeding strategies of sheep and goats under harsh climates. Zaragoza : CIHEAM, 2004. p. 221-226.

Global Environment Centre Foundation Annual Report 2012, Issued Mar. 2014 in 28 pages.

Google Search Report on "seed processing with grinder, screen and baffle," retrieved on Oct. 27, 2022 in 3 pages.

Goto, T., et al., Simple analytical method for aflatoxin contamination in dried oil palm frond (OPF) and OPF base feed. Mycotoxins, vol. 52 (2), pp. 123-128, 2002 in 6 pages.

Hamza, Akila, et al., Use of different silages as new feed resources for ruminants. Archiva Zootechnica 12:2, pp. 79-88, 2009 in 10 pages.

Hassan, O. Abu, et al., Oil-Palm Fronds as a Roughage Feed Source for Ruminants in Malaysia. Malaysia Agriculture Research and Development Institute (MARDI) and National Grassland Research Institute, pp. 1-8, 1996 in 8 pages.

Hassim, H.A., et al., "Dietary inclusion of oil palm fronds does not change n-6 nor n-3 content of lamb tissue", Small Ruminant Research, Elsevier, Amsterdam, NL, vol. 112, No. 1, Oct. 3, 2012, pp. 69-72, XP028547783, ISSN: 09-21-4488, DOI: 10.1016/J.SmallRumres.2012-09-007 *abstract* *Paragraph "2.1 Animals and diets"*.

Hassim, H.A., et al., Effect of different inclusion levels of oil palm fronds on in vitro rumen fermentation pattern, fatty acid metabolism and apparent biohydrogenation of linoleic and linolenic acid. Animal Feed Science and Technology, vol. 162, pp. 155-158, 2010 in 4 pages.

Heuzé V., Sauvant D., Tran G., 2012. Oil Palm Fronds and Oil Palm Crop Residues. Feedipedia.org. A programme by INRA, CIRAD, AFZ and FAO. http://www.feedipedia.org/node/6916. Last updated on Jul. 10, 2012, 11:26. Accessed May 14, 2013 in 3 pages.

Husin, M., et al., Availability and Potential Utilisation of Oil Palm Trunks and Fronds Up to the Year 2000. PORIM Occasional Paper, No. 20, 17 pages plus book cover and table of contents, 1986 in 21 pages.

International Search Report and Written Opinion for International Application No. PCT/US2014/017207, mailed on Jun. 11, 2004 in 13 pages.

Ishida, M., et al., Utilization of Oil Palm Frond as Cattle Feed. JARQ, vol. 31, pp. 41-47, 1997 in 7 pages.

Islam, M., et al., Productivity and Nutritive Values of Different Fractions of Oil Palm (*Elaeis guineensis*) Frond. Department of Animal Science, Universiti Putra Malaysia, pp. 1113-1120, 2000 in 8 pages.

Jalaludin, S., Integrated Animal Production in the Oil Palm Plantation. Universiti Pertanian Malaysia, pp. 1-4, 1996 in 4 pages.

Kawamoto, H., et al., Palatability, Digestibility and Voluntary Intake of Processed Oil Palm Fronds in Cattle. JARQ, vol. 35 (3), pp. 195-200, 2001 in 6 pages.

Khamseekhiew, B., et al., Ruminal and Intestinal Digestibility of Some Tropical Legume Forages. Department of animal Science, Universiti Putra Malaysia, pp. 321-325, 2001 in 5 pages.

Lim, K.O., et al., Plant Based Energy Potential and Biomass Utilization in Malaysia. International Energy Journal, vol. 1, No. 2, pp. 77-88, 2000 in 12 pages.

Mahgoub et al., Effects of feeding ensiled data palm fronds and a by-roduct concentrate on performance and meat quality of Omani sheep, Amimal Feed Science and Technology, Amsterdam, NL, vol. 135, No. 3-4, May 5, 2007.

Mahgoub, et al. Dates: Production, Processing, Food and Medicinal Values; A. Manackavasagan, M. Mohamed Essa, and E. Sukumar CRC Press 2012, Chapter 23, pp. 323-338; Print ISBN: 978-1-4398-4945-3 eBook ISBN: 978-1-4398-4947-7.

Mahgoub, Osman, et al., Effects of feeding ensiled data palm fronds and a by-product concentrate on performance and meat quality of Omani sheep, Animal Feed Science and Technology, 135 (2007) 210-221.

Medjekal, S., Arhab, R., and Bousseboua, H., "Nutritive value assessment of some desert by-products by gas production and rumen fermentation in vitro," Livestock Research for Rural Development 23 (3) 2011, Published Mar. 6, 2011, http://www.lrrd.org/lrrd23/3/medj23046.htm, printed Mar. 17, 2015.

"Nutrient Requirements of Beef Cattle—Oklahoma State University", downloaded from pods.dasnr.okstate.edu/docushare/dsweb/Get/Document.../E-974web.pdf Dec. 30, 2006, 25 pages.

Office Action received in co-pending Canadian Application No. 2902053, dated Jun. 6, 2016 in 3 pages.

Office Action received in co-pending Japanese Application No. 2015-558928, mailed Feb. 29, 2016 in 8 pages including English translation.

Office Action received in co-pending Japanese Application No. 2015-558928, mailed Aug. 8, 2016 in 4 pages including English translation.

Office Action received in co-pending Korean Application No. 10-2015-7026053, dated Mar. 31, 2016 in 5 pages including English translation.

Office Action received in co-pending Korean Application No. 10-2015-7026053, dated Oct. 7, 2016 in 9 pages.

Palm Fronds are leaves, Google Search, retrieved on May 26, 2023 in 4 pages.

Palm Press Fiber, Google Search, retrieved on Oct. 27, 2022 in 4 pages.

Rasby, et al. "Understanding and Using a Feed Analysis", downloaded from Report "http"//www.ianrpubs.unl.edu/pages/publicationD.jsp?publicationId-1055, dated Sep. 2008, 11 pages.

Supplementary Partial European Search Report in co-pending European Application No. EP 14 75 4449, dated Sep. 19, 2016 in 7 pages.

Supplementary European Search Report for PCT/US2014017207 dated Jan. 17, 2017 in 10 pages.

Vaughan, et al., "Seed Processing and Handling," Seed Technology Laboratory, 1968 in 153 pages.

Zahari, M. Wan, et al., Utilization of Oil Palm Frond-Based Diets for Beef and Dairy Production in Malaysia. Journal of Animal Science, pp. 625-634, 2003 in 11 pages.

"Patent Landscape Report: Palm Oil Production and Waste Treatment Technologies", WIPO Publication No. 947/4E, 2016, in 124 pages.

\* cited by examiner

PALM-BASED ANIMAL FEED

INCORPORATION BY REFERENCE TO RELATED APPLICATIONS

This application is a continuation of U.S. patent application Ser. No. 14/769,058, filed Aug. 19, 2015, which is a U.S. National Phase Application of PCT Application No. PCT/US2014/017207, filed Feb. 19, 2014, which claims the benefit of U.S. patent application Ser. No. 13/794,686, filed Mar. 11, 2013; U.S. Provisional Patent Application No. 61/775,435, filed Mar. 8, 2013; and U.S. Provisional Patent Application No. 61/767,165, filed Feb. 20, 2013, the entire contents of all of which are hereby incorporated by reference herein.

BACKGROUND

Field of the Invention

The present disclosure relates generally to the field of animal feeds.

Description of the Related Art

Various products and combinations of products are used in animal feed. Many of them are subject to variations in weather. Current animal feeds have various limitations and disadvantages, and a need exists for further improvement.

SUMMARY

World demand for animals and animal products is tremendous and continually growing. The U.S. cattle and dairy industries alone are billion dollar industries. They involve millions of head of cattle that consume billions of dollars of feed annually. Animal feed can come from a variety of sources, but typically involves a significant component that is from crops that are grown specifically for the purpose of serving in animal feed or that is susceptible to drought and may struggle in arid conditions. For example, alfalfa, which is regularly found in cattle feed, struggles during dry and hot seasons. The tremendous demand for cattle feed can strain resources.

Various animal feeds described herein can be based on palm fronds. Palm trees are found throughout the World in arid locations and palm fronds are frequently viewed as a source of waste or trash. Palm fronds are commonly burned or chopped up to be dispersed. However, palm fronds have a variety of nutrients.

Generally, palm fronds have an estimated Total Digestible Nutrient (TDN) content that can be greater than or equal to approximately 40% and/or less than or equal to approximately 60%. For example, palm fronds from Mexican Fan Palms (*Washingtonia robustas*) have an estimated TDN content of approximately 51.8% on a dry matter basis. Similarly, Deglet Noor palm fronds can have a TDN content of approximately 52.1% on a dry matter basis. Oil palm fronds have been estimated to have a metabolizable energy (ME) content of approximately 5.65 MJ/kg. Palm fronds harvested during the spring, such as during and between March and May, can have higher energy and TDN contents than they do during other times during the year. Rather than being discarded, such palm fronds can be used in animal feed, helping generate an animal feed that is based on recycled products. Palm-based animal feeds can be used to feed a variety of animals, including horses or ruminants such as cattle, sheep, goats, pigs, or camels.

Because of their toughness, preparing palm fronds into a desired form has presented various difficulties. Various embodiments described herein relate to methods of preparing and processing palm fronds for convenient transport, storage, mixing with additional components, and/or consumption. This can make it much more efficient and easy to generate an animal feed based on palm fronds, rather than discarding them as is frequently done.

Many varieties of palms grow palm fruit, such as dates, which are also very nutritious. Generally, dates can have a TDN content that is greater than or equal to approximately 65% and/or less than or equal to approximately 90%. For example, dates from a Deglet Noor Palm tree can have a TDN content of approximately 87.9% on a dry basis. Dates from Canary Palms can have a TDN content of approximately 86.7% on a dry basis. In various embodiments described herein, dates and palm fronds can be combined in different forms and quantities in order to create a nutritious, effective, and sustainable animal feed from what was previously considered largely waste. Additionally, the main products of this feed can be grown in hot and dry conditions. In fact, these sources can thrive in conditions that might destroy products currently used in cattle feed.

In some embodiments, additional additives can be combined with palm fruit and palm fronds in order to adjust nutritional content. For example, nutritional additives, such as urea, can be included to increase the available levels of nutritional content, such as protein, within the animal feed. In some embodiments, nutritional additives, such as wheat, corn, or other components described herein can be included to increase the available levels of nutritional content, such as protein, within the animal feed. Various ratios of palm fronds, palm fruit, and nutritional additives are described herein.

In some embodiments, feeds with palm fronds, palm fruits, and additives such as urea, wheat, sorghum, milo, and/or other suitable additives including varieties of grains, can serve as an independent animal feed. The various benefits of palm and palm fruit, however, make them desirable for use together or independently in different combinations with different types of animal feeds. Thus, in some embodiments, feeds with palm fronds, palm fruits, and additives such as urea, wheat, and/or other suitable additives, can serve as a base feed to be combined with additional components depending on the desired characteristics of a final feed. In some embodiments, palm fronds themselves can serve as a base feed to be mixed with additional components. In some embodiments, palm fruit and/or seeds can be combined with general base feeds, such as alfalfa, soy, corn, hay, or grass, which can also be mixed with a portion of palm fronds.

According to various embodiments described herein, an animal feed can include a processed palm frond component, a palm fruit component, and a nutritional additive. The palm fruit component and the nutritional additive can have a ratio by weight between 5:1 and 7:1. In some embodiments, the palm fruit can be dates. In some embodiments, the nutritional additive can be urea. In some embodiments, the nutritional additive can be wheat. In some embodiments, palm fruit component and the nutritional additive have a ratio by weight of approximately 6:1. In some embodiments, the processed palm frond component can have a moisture content between 10 and 14%. In some embodiments, the palm frond component, the palm fruit component, and the nutritional additive can have a ratio by weight of approximately 2000 parts palm frond to approximately 25 parts palm fruit to approximately 4 parts nutritional additive.

According to various embodiments described herein, a method of making an animal feed can include collecting palm fronds, shredding, chopping, or grinding the palm fronds, and combining a palm fruit component and a nutritional additive to the palm fronds, wherein the palm fruit component and the nutritional additive have a have a ratio by weight between 5:1 and 7:1. In some embodiments, the palm fruit can be date. In some embodiments the nutritional additive can be urea. In some embodiments, the nutritional additive can be wheat. In some embodiments, collecting palm fronds can include collecting palm fronds with a moisture content between about 10% and about 14%. In some embodiments, making an animal feed can include drying the palm fronds to a moisture content between about 10% and about 14%. In some embodiments, shredding, chopping, or grinding the palm fronds includes shredding the palm fronds. In some embodiments, the palm fronds can be chopped after they are shredded. In some embodiments, the palm fronds can be ground after they are chopped.

According to various embodiments described herein, a method of making an animal feed can include collecting palm fronds and drying the palm fronds in wind rows. The palm fronds can be shredded, chopped, and/or ground when dried to a desired moisture content. The palm fronds can be combined with a palm fruit component, such as dates, to the palm fronds. The dates can be combined, for example, in a ratio of 8 units by volume of palm fronds for every unit by volume of dates. In some embodiments, the dates can be combined in a ratio of 8 pounds of date for every 50 pounds of palm fronds. In some embodiments, the palm frond and date mixture can be chopped and/or ground. This mixture can be fed through a mill to collect mill run, such as wheat or other grain or material. In some embodiments, the resulting mixture can have approximately 30% mill run by weight. In some embodiments it can have more or less. The mixture of palm frond, date, and mill run can then be run through a feed compressing machine, such as a cubing machine or pelletizer.

In some embodiments, the palm fruit component and the nutritional additive can have a ratio by weight of approximately 6:1. In some embodiments, the palm fruit and nutritional additive components can be combined with the palm fronds according to a ratio by weight of approximately 2000 parts palm frond to approximately 25 parts palm fruit to approximately 4 parts nutritional additive.

In some embodiments, an animal feed can include a processed palm frond component, a palm fruit component, and a nutritional additive wherein the animal feed has a nutritional content at one or more of the following levels: approximately 15% crude protein, approximately 3% crude fat, approximately 25% crude fiber, approximately 12% ash, and approximately 0.5% minerals.

In some embodiments, the animal feed can have a nutritional content that includes a crude protein content that is greater than or equal to approximately 5% and/or less than or equal to approximately 30%, a crude fat content that is greater than or equal to approximately 2% and/or less than or equal to approximately 8%, a crude fiber content that is greater than or equal to approximately 15% and/or less than or equal to approximately 45%, an ash content that is greater than or equal to approximately 4% and/or less than or equal to approximately 17%, and a mineral content that is greater than or equal to approximately 0.1% and/or less than or equal to approximately 1%.

In some embodiments, the animal feed can have a nutritional content that includes a crude protein content that is greater than or equal to approximately 12% and/or less than or equal to approximately 15%, a crude fat content that is greater than or equal to approximately 2% and/or less than or equal to approximately 5%, a crude fiber content that is greater than or equal to approximately 20% and/or less than or equal to approximately 30%, an ash content that is greater than or equal to 8% and/or less than or equal to 12%, and a mineral content that is greater than or equal to 0.3% and/or less than or equal to 0.7%.

In some embodiments, an animal feed can include a palm frond component that includes chopped palm fronds having a moisture content between 10% and 25%; a palm fruit component including one or more of dates, palm berries, and palm seeds; and a nutritional additive. In some embodiments, the palm fruit component and the nutritional additive have a ratio by weight between 5:1 and 7:1. In some embodiments, the animal feed has a crude protein content between 5% and 30% and a fiber content between 15% and 45%.

In some embodiments, a method of making an animal feed from palm fronds can include collecting palm fronds, placing the palm fronds in rows, allowing the palm fronds to dry to a moisture content of between 10% and 25%, chopping the palm fronds, grinding the palm fronds, and combining a palm fruit component and a nutritional additive to the palm fronds. In some embodiments, the ratio of palm fronds to palm fruit can be between approximately 70:1 and approximately 90:1. In some embodiments, the combined palm fronds, palm fruit, and nutritional additive can be cubed.

In some embodiments, an animal feed can include a processed palm frond component, a palm fruit component, and a nutritional additive, wherein the nutritional additive is between 20 and 40 percent of a total weight of the animal feed. In some embodiments, the palm fruit can be date. In some embodiments, the nutritional additive can be wheat. In some embodiments, the processed palm frond components can have a moisture content between 10% and 14%. In some embodiments, the feed can be cube and/or pellet shaped. In some embodiments, the nutritional additive can be mill run from a mill. In some embodiments, the mill run comprises wheat.

In some embodiments, a method of cleaning a mill with an animal feed can include providing a base feed comprising a palm frond component and a fruit component, passing the base feed through an inlet to a mill that contains mill run different from the base feed, and collecting a mixture of the base feed and mill run from an outlet to the mill. In some embodiments, the mixture can include at least about 5 percent mill run by weight. In some embodiments, the mixture can include at least 20 percent or about 20 percent mill run by weight. In some embodiments, the mixture can include between 20 percent (or about 20 percent) and 40 percent (or about 40 percent) mill run by weight. In some embodiments, the ratio of the palm frond component to the fruit component in the base feed is about 8 to 1 by volume. In some embodiments, the ratio is about 8 to 10 by weight. In some embodiments, the mill run can include wheat. In some embodiments, the fruit component can be palm fruit, such as dates. In some embodiments, the mixture of the base feed and mill run can be fed through a feed compressing machine. In some embodiments, the feed compressing machine can be a cubing machine or a pelletizer.

DETAILED DESCRIPTION OF THE PREFERRED EMBODIMENT

Figure 1:
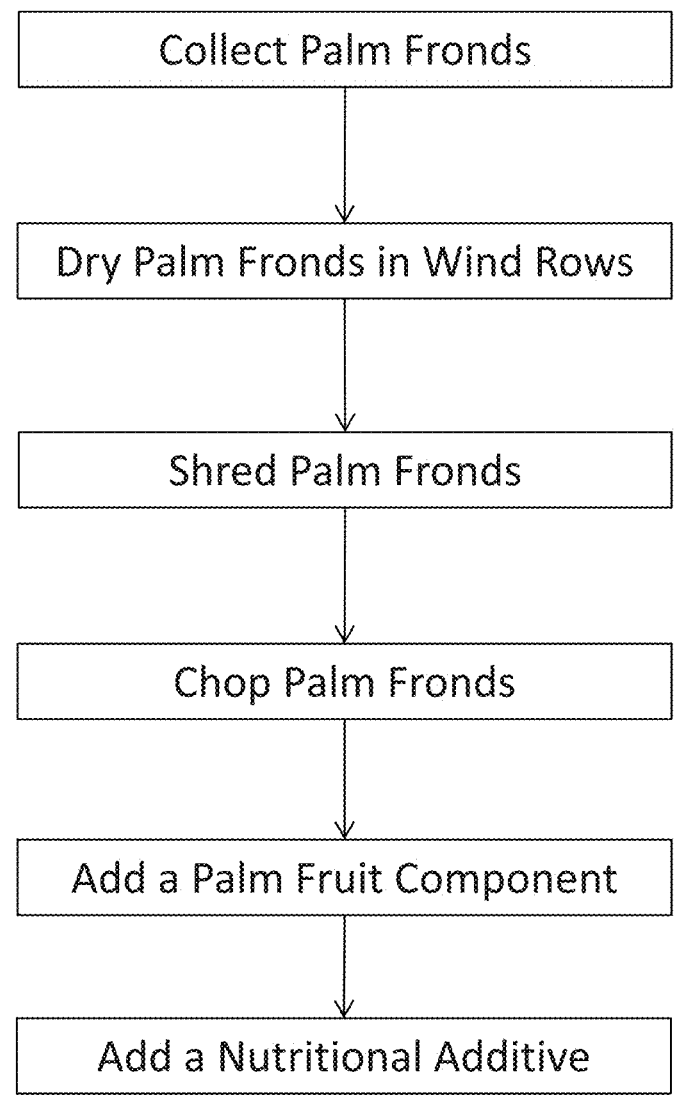
FIG. 1 is a block diagram of one embodiment of a method of preparing an animal feed.

Animal feed formed with a base of palm fronds and combined with palm fruit, such as dates, is a sustainable and affordable feed product that can be developed in hot climates. Palm fronds with a desired moisture content are shredded, chopped and/or ground, and mixed with palm fruit. Additives such as urea can increase the nutritional content. Feeds with palm fronds, palm fruit, and/or additives can serve as a base feed for other components. Palm fronds can also serve as a base feed for other components. Animal feeds with a variety of bases can have palm fruit added. Animal feeds with a variety of bases, including palm fronds, can include a variety of other components added.

Processed palm fronds and palm fruit, such as dates, can be combined according to a variety of different ratios. For example, in some embodiments palm fronds and palm fruit can be combined according to a ratio by weight of approximately 80 pounds of processed palm fronds for each pound of palm fruit. In some embodiments, the ratio by weight of processed palm fronds to palm fruit can be greater than or equal to approximately 70 and/or less than or equal to approximately 90. In some embodiments, smaller ratios may be desired. For example, in some embodiments palm fronds and palm fruit can be combined according to a ratio by weight of approximately 8 pounds of processed palms fronds for each pound of palm fruit. In some embodiments, the ratio can be approximately 5 to 1, or even lower, such as approximately 2.5 to 1, 1 to 1, or less than 1 to 1. In some embodiments, palm fronds and palm fruit can be combined according to a ratio by weight of approximately 8 pounds of processed palm fronds for each 10 pounds of palm fruit. In some embodiments, this ratio can be approximately 5 pounds of processed palm fronds for each 10 pounds of palm fruit. In some embodiments, the ratio can be approximately 1 pound of processed palm fronds for each 10 pounds of palm fruit.

In some embodiments, larger ratios may be desired. For example, in some embodiments palm fronds and palm fruit can be combined according to a ratio by weight of approximately 10 pounds of processed palms fronds for each pound of palm fruit. In some embodiments, the ratio can be approximately 12 to 1. In some embodiments, the ratio can be approximately 15 to 1, 20 to 1, or even larger, such as approximately 25 to 1 or greater in some embodiments.

In some embodiments, these ratios can be by volume instead of by weight. For example, a ratio by volume of 8 to 1 would indicate that a mixture of processed palm fronds and palm fruit was formed by mixing 8 scoops of processed palm fronds with 1 scoop of palm fruit. Preferably, in embodiments where processing machines are used, such as described further below, the ratio is such that the mixture is not too sticky to gum up or block the processing machine. In other embodiments, stickiness of the mixture is desirable and advantageous to produce a desired feed consistency and composition.

In some embodiments, nutritional additives can be added to the mixture to modify the desired nutritional content. For example, in some embodiments, urea can be combined with palm fronds and dates. This can increase the available protein content. Finding the correct mixture can help maximize the protein content. If too much urea is added, it may actually diminish the total protein content of the mixture. In some embodiments, a preferred ratio by weight of dates to urea within a palm frond base can be 6:1. In some embodiments the ratio by weight of dates to urea within a palm frond base can be greater than or equal to approximately 5:1 and/or less than or equal to approximately 7:1. In some embodiments, the ratio by weight of dates to urea within a palm frond base can be greater than or equal to approximately 11:2 and/or less than or equal to approximately 13:2. In some embodiments, the identified ratios of dates to urea can be by volume instead of weight.

In some embodiments, an animal feed can include approximately 98.6% palm frond by weight, approximately 1.2% date by weight, and approximately 0.2% urea by weight. In some embodiments, an animal feed can include weight-based ratios of palm frond to date to urea of 2000 to 25 to 4. The ratios of different components can vary according to different embodiments. In some embodiments, an animal feed can include weight-based ratios of palm frond to date to urea of 2000 to 24 to 4. In some embodiments, the weight-based ratio of palm frond to the combined weight of dates and urea can be between 65:1 and 75:1.

In some embodiments, other additives can be added to a mixture of palm fronds and palm fruit or to a mixture of palm fronds, palm fruit, and urea in order to modify the desired nutritional content. These additives can include, but are not limited to, almond shells, walnut husks, peanut shells, pits, and/or other rough, edible products; cotton seed, corn, wheat, brewer's grain, distiller's grain, potato, lettuce, tomato, peaches, apples, strawberries, soy, turnips, and/or fruit rind or peel, etc.; and/or beet pulp, sugar beets, sugar cane, citrus fruits, oranges, grapefruit, lemons, grapes, and/or raisins, etc.

For example, in some embodiments, wheat can be combined with palm fronds and dates or other fruit or sugar components. This can increase the protein content. Wheat can be in the form of mill run in some embodiments. In some embodiments, a preferred ratio by weight of wheat to dates within a palm frond base can be 3:1. In some embodiments the ratio by weight of wheat to dates within a palm frond base can be greater than or equal to approximately 1:1 and/or less than or equal to approximately 5:1. In some embodiments the ratio by weight of wheat to dates within a palm frond base can be greater than or equal to approximately 2:1 and/or less than or equal to approximately 4:1. In some embodiments the ratio by weight of wheat to dates within a palm frond base can be greater than or equal to approximately 5:1 or less than or equal to approximately 1:1. In some embodiments the ratio by weight of wheat to dates within a palm frond base can be greater than or equal to approximately 10:1. In some embodiments the ratio by weight of wheat to dates within a palm frond base can be greater than or equal to approximately 15:1. In some embodiments, the identified ratios of wheat to dates can be by volume instead of weight. In other embodiments, suitable mixtures can be achieved using another fruit and/or vegetable component and/or another protein component.

In some embodiments, an animal feed can include approximately 60% palm frond by weight, approximately 10% date or other fruit or sugar component by weight, and approximately 30% wheat or other grain component by weight. In some embodiments, an animal feed can include weight-based ratios of palm frond to date to wheat of 6 to 1 to 3. The ratios of different components can vary according to different embodiments. In some embodiments, an animal feed can include weight-based ratios of palm frond to date to wheat of 5 to 1 to 4. In some embodiments, an animal feed can include weight-based ratios of palm frond to date to wheat of 7 to 1 to 2. In some embodiments, an animal feed can include weight-based ratios of palm frond to date to wheat of 8 to 1 to 4. In some embodiments, an animal feed can include weight-based ratios of palm frond to date to wheat of 8 to 1 to 5. In some embodiments, an animal feed can include weight-based ratios of palm frond to date to wheat of 8 to 1 to 3. In some embodiments, an animal feed can include weight-based ratios of palm frond to date to wheat of 20 to 1 to 9. In some embodiments, the proportion of date can be greater, and an animal feed can include weight-based ratios of palm frond to date to wheat such as 0.75 to 1 to 0.75.

In some embodiments, the weight-based ratio of palm frond to the combined weight of dates and wheat can be between 1:1 and 2:1. In some embodiments, the weight-based ratio of palm frond to the combined weight of dates and wheat can be greater than 2:1. In some embodiments, the weight-based ratio of palm frond to the combined weight of dates and wheat can be less than 1:1. In other embodiments, suitable mixtures can be achieved using other fruit and/or vegetable components and/or other protein components.

In some embodiments, an animal feed can include lower proportions of a palm frond component. For example, in some embodiments an animal feed can include approximately 33% palm frond by weight, approximately 33% date or other fruit or sugar component by weight, and approximately 33% wheat or other grain component by weight. Thus, in some embodiments an animal feed can include weight-based ratios of palm frond to date to wheat of 1 to 1 to 1. In some embodiments, an animal feed can include weight-based ratios of palm frond to date to wheat of 0.8 to 1 to 0.8. In some embodiments, an animal feed can include weight-based ratios of palm frond to date to wheat of 0.1 to 1 to 0.5. In some embodiments, an animal feed can include weight-based ratios of palm frond to date to wheat of 2.5 to 1 to 1.

In some embodiments, the weight-based ratio of the combined weight of dates and wheat to the weight of palm frond can be between approximately 1:1 and approximately 15:1. In some embodiments, the weight-based ratio of the combined weight of dates and wheat to palm frond can be between approximately 1:1 and approximately 10:1. In some embodiments, the weight-based ratio of the combined weight of dates and wheat to palm frond can be between approximately 1:1 and approximately 5:1. In some embodiments, the weight-based ratio of the combined weight of dates and wheat to palm frond can be between approximately 1:1 and approximately 3:1.

Dates and/or other palm fruit can be added to the palm fronds according to a variety of methods. In some embodiments, the dates can be diced, chopped, or crumbled and mixed in as such. In some embodiments the dates can be chopped into fine crystals, having a consistency roughly equivalent to sugar. In some embodiments, the dates can be liquefied and poured or sprayed onto the palm fronds. In some embodiments, a liquid, such as water, can be added to the dates to make them easier to pour, spray, and/or mix with the palm fronds. In some embodiments additional additives, such as the urea and/or wheat, can be mixed with the dates before being mixed with the palm fronds. In some embodiments, additional additives can be added to the palm fronds before or after the dates. In some embodiments, date (or other additive) and palm frond can be chopped and/or ground after the dates (or other additive) and palm fronds have been mixed together.

The mixtures described herein can produce a product that rivals or surpasses the nutritional content of current feeds. For example, in some embodiments a mixture can have a TDN content of approximately 55%. It can have an a crude protein content of approximately 15%, a crude fat content of approximately 2.7%, a crude fiber content of approximately 25%, and an ash content of approximately 12%. In some embodiments, additional minerals can be included, either through the urea or other additive, and the final result can have approximately 0.5% of minerals.

In some embodiments a mixture can have varying levels of a crude protein content. For example, in some embodiments a mixture can have a crude protein content that is greater than or equal to approximately 5% and/or less than or equal to approximately 30%. In some embodiments, a mixture can have a crude protein content that is greater than or equal to approximately 8% and/or less than or equal to approximately 15%. In some embodiments, a mixture can have a crude protein content that is greater than or equal to approximately 12% and/or less than or equal to approximately 15%. In some embodiments, a desired protein content can depend on the type of animal expected to eat the feed. For example, in some embodiments feed prepared for dairy cattle can have a crude protein content that is greater than or equal to approximately 10% and/or less than or equal to approximately 20%. In some embodiments, feed prepared for beef cattle can have a crude protein content that is greater than or equal to approximately 20% and/or less than or equal to approximately 30%.

Other nutritional content of mixtures described herein can similarly vary. For example, in some embodiments a mixture can have a TDN that is greater than or equal to approximately 45% and/or less than or equal to approximately 65%. In some embodiments a mixture can have a TDN that is greater than or equal to approximately 50% and/or less than or equal to approximately 60%.

In some embodiments a mixture can have a crude fat content that can be greater than or equal to approximately 2% and/or less than or equal to approximately 8%. In some embodiments a mixture can have a crude fat content that can be greater than or equal to approximately 2% and/or less than or equal to approximately 5%.

Similarly, in some embodiments a mixture can have a fiber content that can be greater than or equal to approximately 15% and/or less than or equal to approximately 45%. In some embodiments, a mixture can have a fiber content that can be greater than or equal to approximately 20% and/or less than or equal to approximately 30%.

The ash content in some embodiments can be greater than or equal to 4% and/or less than or equal to 17%. In some embodiments, the ash content can be greater than or equal to approximately 8% and/or less than or equal to approximately 12%. In some embodiments laws may limit the ash content that can be in the feed, and the ash content can be capped at a legal limit, for example at 12%. The amount of minerals and/or additives can in some embodiments be greater than or equal to approximately 0.2% and/or less than or equal to approximately 1%.

The use of any type of palm frond is contemplated. For example, *Washington robustas* (Mexican Fan Palms), *Washingtonia filiferas* (California Fan Palms), *canariensis* (Canary Island Date Palms), *Phoenix dactylifera* (Date Palms), or any other date or oil palm can be used. Similarly, any type of date can be used. In some embodiments, other fruits or materials besides dates can be used. For example, palm seeds or other types of palm fruit, such as oil palm berries, can be used instead of or in addition to dates. These alternative fruit or fruit mixtures can be combined with palm fronds and/or other additives such as urea and/or wheat according to the various ratios described herein.

Palm fronds can be tough, and general processing used for other types of feed bases, such as alfalfa, to prepare for use in feeds may be insufficient or too expensive for palm fronds. For example, placing raw palm fronds into a tub grinder may not produce palm fronds that are sufficiently chopped to be used in feeds. Additionally, raw palm fronds are generally too wet to be thrown directly into a tub grinder or other grinding or chopping machine. A variety of processes can be used to put the palm fronds into a form suitable for feed before combining them with dates or other products. FIG. 1 illustrates one method that can be used to process the palm fronds and combine them with palm fruit and/or other additives. Other methods can be used and variations of the described method can be used as well. In some embodiments, once palm fronds have been collected, they can be laid out in wind rows. This can allow the wind and/or ambient air to dry the palm fronds. Steps can be taken to ensure growth of mold within the palm fronds is prevented or limited. For example, the wind rows can be sized such that the palm fronds are not packed too tightly or thickly, allowing fronds in the middle to dry. Additionally or alternatively, the fronds can be periodically turned over or mixed to prevent the growth of mold and to make sure that the fronds dry evenly. Preferably the palm fronds are arranged for drying in a manner that limits the amount of heat generated by the stacked palm fronds during the drying process.

Preferably, the fronds are allowed to dry until they have a moisture content greater than or equal to approximately 10% and/or less than or equal to approximately 14% In some embodiments, a moisture content greater than or equal to approximately 10% and/or less than or equal to approximately 20% can be used. In some embodiments, a moisture content greater than or equal to approximately 5% and/or less than or equal to approximately 15% can be used. In some embodiments, a moisture content greater than or equal to approximately 10% and/or less than or equal to approximately 25% can be used. In some embodiments the moisture content can exceed 25%.

Figure 2:
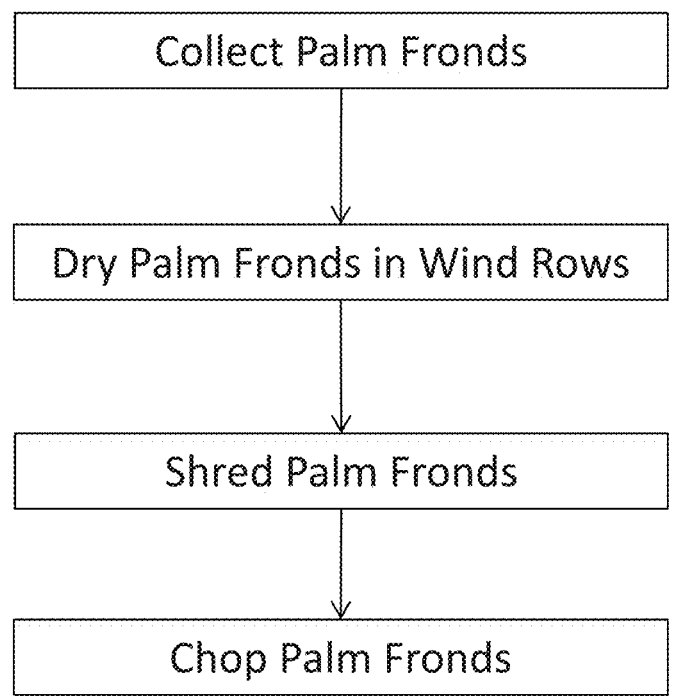
FIG. 2 is a block diagram of one embodiment of a method of processing a palm component.
Figure 3:
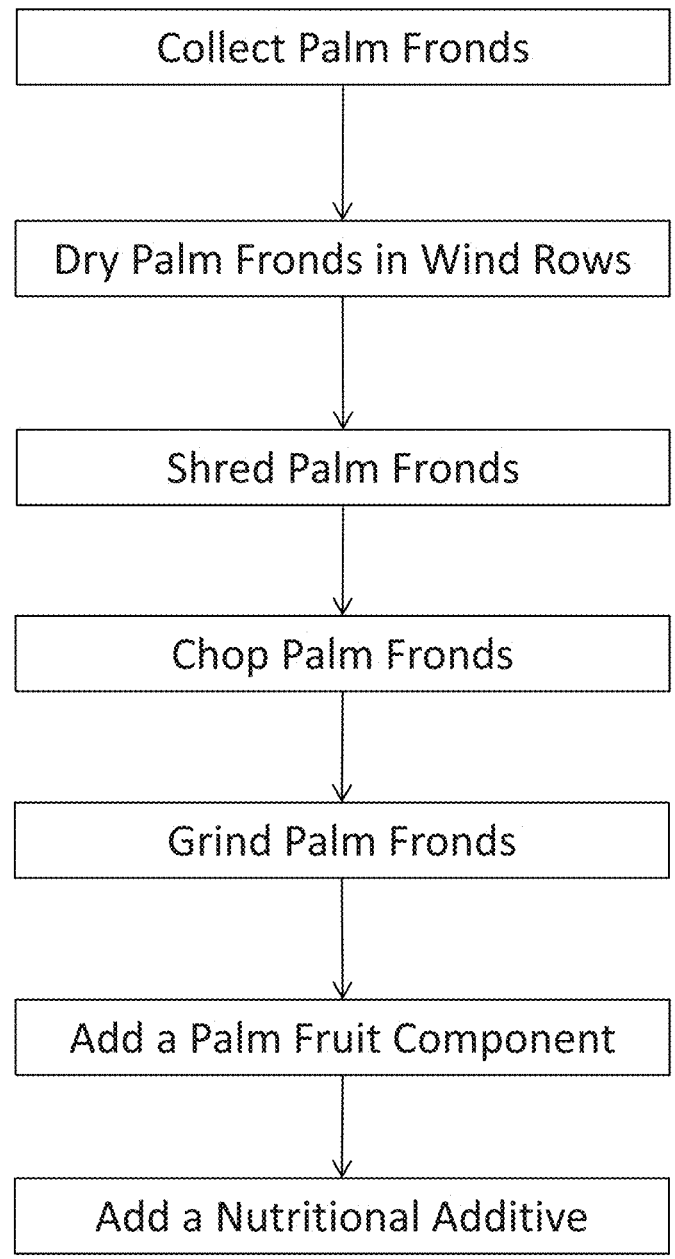
FIG. 3 is a block diagram of one embodiment of a method of preparing an animal feed.
Figure 4:
FIG. 4 is a block diagram of one embodiment of a method of processing a palm component.

Once the palm fronds have reached a desired moisture content they can be processed according to a variety of methods. In some embodiments, a shredder can be pulled over the rows to shred the palm fronds. Additionally or alternatively, the palm fronds can be fed through a shredder. As an example, a shredder sold under the brand name Balzer can be used to shred the palm fronds. Once the palm fronds have been shredded, a chopper can be used to chop the palm fronds into finer pieces. As an example, a chopper sold under the brand name Forest Harvester can be used. The chopper can also be used to harvest the dried palm fronds from the ground, passing them into a container as they are chopped. One embodiment of this method of processing palm fronds is illustrated in FIG. 2. In some embodiments, just a shredder or just a chopper can be used. In some embodiments, as illustrated in FIG. 3, the palm fronds can be ground, such as by passing through a tub grinder after being shredded and/or chopped. As an example, a tub grinder sold under the brand name Roto Grind can be used. In some embodiments, palm fronds can pass through a grinder multiple times or through multiple grinders. In some embodiments, a cone grinder can be used instead of or in addition to a tub grinder. One embodiment of a method of processing palm fronds with a grinder is illustrated in FIG. 4.

The processed palm fronds can form a base product that can be combined according to the various mixtures described above, forming an animal feed. In some embodiments, various mixtures, such as mixtures described herein, can be formed within a grinder. Thus, for example, in some embodiments palm fruit and/or other additives can be added with the palm fronds into the grinder.

Once a desired formulation has been achieved, the products can be prepared for use according to a variety of manners. In some embodiments, the feed can be left loose as initially mixed. In some embodiments, the feed can be baled or formed into cubes or other shapes. In some embodiments, baling or forming feed into cubes or other shapes can be done after feed has been chopped, shredded, and/or ground. One advantage of mixing dates into the palm fronds is that the dates can help provide a binding function, making it easier to form the feed into cubes or any desired shape. It is understood that "cube" is a broad term and is used in its ordinary sense in this application, including, for example, to refer broadly to a compressed feed mixture. References to a cubed shape can refer to a generally square or rectangular shape or to having a generally square or rectangular shaped cross section, but other shapes and cross sections are possible and contemplated, such as, for example, pellets and/or generally cylindrical shapes and/or shapes with a circular or rounded cross section. Cubed feed may have one or more sides or dimensions that are longer than one or more of the other sides or dimensions. In some embodiments, different cubes within a batch of cubed feed may have different dimensions from other cubes within the batch. Additionally, the cubes do not necessarily have defined shapes, sides, edges or corners.

In some embodiments cubes or other forms of compressed feed can be formed with a feed compressing machine, such as a cubing machine or a pelletizer. In some embodiments, the machine can include a grinder that can mix and/or grind the components. In such embodiments, the grinder of the feed compressing machine can be used in addition to or instead of a grinder during the process described with respect to FIG. 2. In some embodiments, the palm fronds added to the feed compressing machine can have been ground into a powder. The machine can convey the resulting feed toward an area that can heat and compress the feed through a die or dies that shapes the feed into a cubed shape. In some embodiments a liquid, such as water, can be added to the mixture as it is compressed through a die. Different dies can produce compressed feed of different sizes and/or shapes. After the feed passes through the die or dies the feed can be conveyed to an area for packaging and/or shipping. In some embodiments, the palm component can be processed into a powder that can be combined with the palm fruit component and one or more nutritional additives and then compressed or formed into cubes and/or other shapes. In some embodiments a powdered palm component can be collected and stored for use as a base or component for other feed mixtures. In some embodiments a palm component in a shredded, chopped, or ground form can be collected and stored for use as a base or component for other feed mixtures.

In some embodiments, a mixture can be passed through a filter, such as a screen or strainer, after it goes through a grinder, whether a first grinder and/or a grinder associated with a feed compressing machine. This can help remove large pieces and hard pieces that might not grind up, such as pits of dates. In some embodiments, a mixture can pass through multiple filters. For example, a grinder may include a filter, and it may be desirable to pass the ground material through a second filter before it goes into the grinder or after it comes out of the grinder.

Cubing the feed can present a variety of advantages. For example, cubed feed can be generally easier and more efficient to ship and/or store. As a further example, because cubes can be compressed when formed, they can have a greater density than loose feed allowing for more feed by mass to fit within the same volume. In some embodiments, cubes can be shipped and/or stored in large containers, such as sacks, boxes, or other containers. In some embodiments, containers can be sized to hold 1000 lbs of cubed feed. In some embodiments they can hold more or less. In some embodiments, cubes can be stored and/or shipped loosely.

Cubing the feed can also extend the shelf life of the feed. For example, in some embodiments loose feed might be good for about a year. Cubed feed can be good for significantly longer. In some embodiments, packaging loose feed or cubed feed can also extend the shelf life of the feed.

In some embodiments, a base feed can be passed through a mill to collect scrap material left in the mill that can be added to the feed. For example, in some embodiments a base feed including a mixture of palm fronds and palm fruit, such as dates, can be fed through a mill that had previously been used to process or transport a first, different feed product. The scraps of the first feed product that remain within the mill (referred to as the "mill run") can be picked up by the base feed and mixed in with it as an additive. For example, a palm frond and palm fruit mixture can be passed through a mill that had previously had wheat or other grains pass through, such as sorghum, milo, corn, etc. The mill run can act as an additive to the palm frond and palm fruit mixture and can add a protein component to the mixture. In some embodiments, this can provide a desired nutritional content for the resulting feed and can also serve to clean the mill run from the various components of the mill, such as tanks, flues, and/or chutes. This can help minimize and/or eliminate cleaning costs that would otherwise be incurred. In some embodiments, the addition of a palm fruit to a base feed passed through the mill can help collect mill run by helping the base feed to adhere to the mill run. Additionally, as the base feed passes through the mill, the mill can help adequately mix the mill run with the base feed.

Figure 5A:
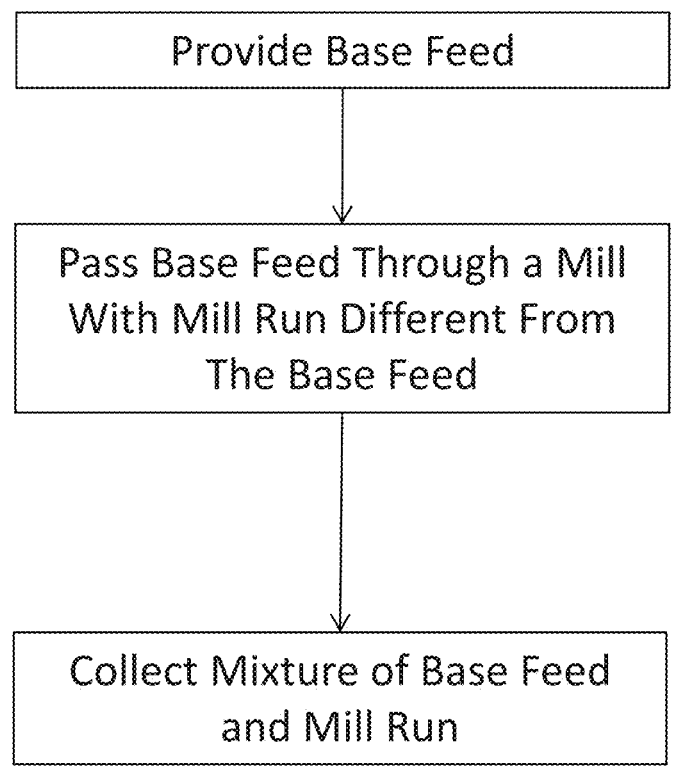
FIG. 5A is a block diagram of one embodiment of a method of cleaning a mill.

FIG. 5A illustrates one embodiment of this method. A base feed can be provided and then passed through a mill. Preferably, the mill had previously been used for a different mixture or material, such as wheat or other grain or additive. In some embodiments, the base feed can include a palm frond component and a fruit component. The fruit component can include palm fruit and/or other component that helps the base feed adhere to the mill run. Thus, for example, in some embodiments the fruit component can include peaches, apples, strawberries, turnips, fruit rind or peel, beet pulp, sugar beets, sugar cane, citrus fruits, oranges, grapefruit, lemons, grapes, and/or raisins, etc. The mixture, which can contain a combination of the base feed and the mill run from the different mixture or material, can then be collected.

Figure 5B:
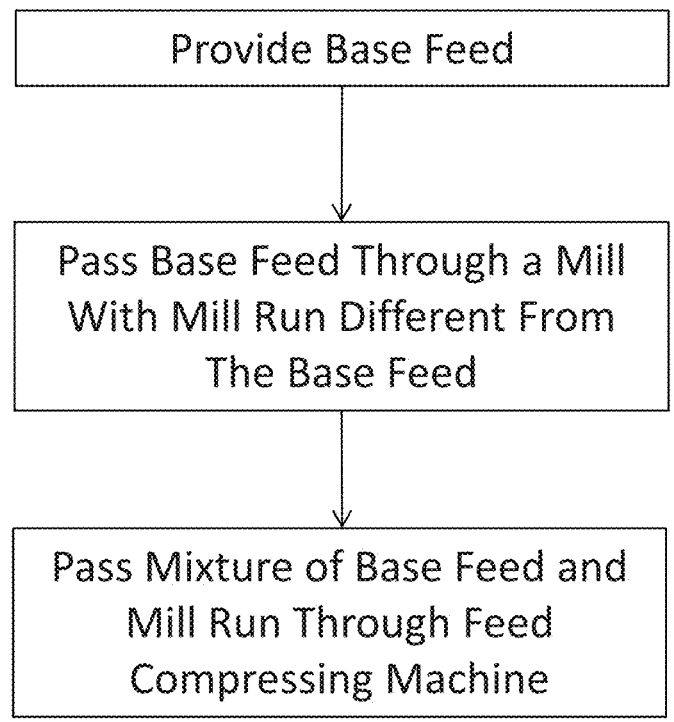
FIG. 5B is a block diagram of one embodiment of a method of preparing a compressed feed mixture such as a cubed and/or pelletized animal feed mixture.

In some embodiments, as illustrated in FIG. 5B, the mixture of the base feed and mill run can be passed through a feed compressing machine, such as a cubing machine or a pelletizer. In some embodiments, the mill can be connected to the feed compressing machine such that the mixture of the base feed and mill run can pass directly into the feed compressing machine from the mill. In such embodiments, the mill can also help provide a desired rate of mixed feed into the feed compressing machine. In some embodiments, the mixture of the base feed and mill run can be collected first from the mill and then inserted into a feed compressing machine.

In some embodiments, a base feed can include any of the feeds described herein, such as various mixtures of processed palm fronds and palm fruit. In some embodiments, a base feed passed through a mill to collect mill run can have at least 5 percent or about 5 percent mill run by weight. In some embodiments, a base feed passed through a mill to collect mill run can have at least 10 percent or about 10 percent mill run by weight. In some embodiments, a base feed passed through a mill to collect mill run can have at least 20 percent or about 20 percent mill run by weight.

In some embodiments, a base feed passed through a mill to collect mill run can have between about 20 and about 40 percent mill run by weight. In some embodiments, a base feed passed through a mill to collect mill run can have between about 10 and about 30 percent mill run by weight. In some embodiments, a base feed passed through a mill to collect mill run can have between about 25 and about 35 percent mill run by weight. In some embodiments, a base feed passed through a mill to collect mill run can have between about 5 and about 20 percent mill run by weight. In some embodiments, a base feed passed through a mill to collect mill run can have greater than 40 percent mill run by weight, such as between approximately 40 percent and approximately 50 percent mill run by weight.

Palm Frond Base Feeds

In some embodiments various components or mixtures of components described herein can be combined with other types of feed sources to adjust desired nutritional contents of the feeds. For example, the processed palm fronds can be used as a base to which a variety of additives can be added for use in animal feed. These additives suitable for use in animal feed can include, for example, dog food, chicken livers, or other sources of protein or other nutrients. Additives can also include plant based products such as citrus products, sugar beet pulp, wheat, brewer's grain, almond husks, peanut shells, grass clipping, fruit rinds and peels, potatoes, or general vegetable scraps. Additives can also include molasses, tortilla scraps, dough and bread products, or any other processed product with nutritional value. These additives can be added to a palm frond base in any desired combination or quantity.

Figure 6:
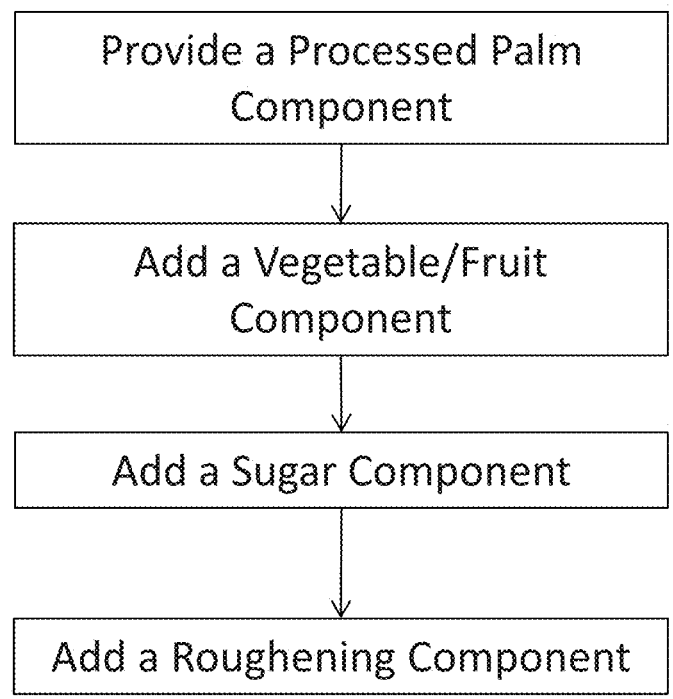
FIG. 6 is a block diagram of one embodiment of a method of preparing an animal feed.

As illustrated in FIG. 6, in some embodiments, a palm frond base can be combined with different proportions of a roughening component, a vegetable and/or fruit component, and/or a sugar component. A roughening component can include, for example, almond shells, walnut husks, peanut shells, pits, or other rough, edible products. A vegetable and/or fruit component can include, for example, cotton seed, corn, wheat, brewer's grain, distiller's grain, potato, lettuce, tomato, peaches, apples, strawberries, soy, turnips, fruit rind or peel, etc. A sugar component can include, for example, beet pulp, sugar beets, sugar cane, citrus fruits, oranges, grapefruit, lemons, grapes, raisins, etc. In some embodiments, particular additives, such as dates, have a high nutritional content and a high sugar content and can be added as a vegetable/fruit component and/or a sugar component. In some embodiments, other vitamins and minerals can also be added.

In some embodiments, the proportions used for an animal feed can depend on the type of animal that is expected to eat it. Although various embodiments described below provide examples specific to dairy and beef cows, it is understood that the various ratios described can be used in feed for a variety of animals, including horses or ruminants such as cattle, sheep, goats, pigs, or camels. Additionally, the various ratios described are understood to in some embodiments describe ratios of pre-mixed volumes and in other embodiments describe ratios by weight. In some embodiments, an animal feed for a dairy cow can have a palm frond component that is greater than or equal to approximately 50% and/or less than or equal to approximately 90%. The feed can have a roughening component that is greater than or equal to approximately 2% and/or less than or equal to approximately 10%. The feed can have a vegetable/fruit component that is greater than or equal to approximately 10% and/or less than or equal to approximately 20%. The feed can have a sugar component that is greater than or equal to approximately 5% and/or less than or equal to approximately 15%.

In some embodiments, an animal feed for a dairy cow can have a palm frond component that is greater than or equal to approximately 60% and/or less than or equal to approximately 80%. The feed can have a roughening component that is greater than or equal to approximately 3% and/or less than or equal to approximately 7%. The feed can have a vegetable/fruit component that is greater than or equal to approximately 13% and/or less than or equal to approximately 17%. The feed can have a sugar component that is greater than or equal to approximately 8% and/or less than or equal to approximately 12%.

In some embodiments, an animal feed for a dairy cow can have a palm frond component that is approximately 70%. The feed can have a roughening component that is 5%. The feed can have a vegetable/fruit component that is approximately 15%. The feed can have a sugar component that is approximately 10%.

In some embodiments, an animal feed for a beef cow can have a palm frond component that is greater than or equal to approximately 40% and/or less than or equal to approximately 60%. The feed can have a vegetable/fruit component that is greater than or equal to approximately 15% and/or less than or equal to approximately 35%. The feed can have a sugar component that is greater than or equal to approximately 15% and/or less than or equal to approximately 35%. In some embodiments, the feed can also have varying amounts of a roughening component.

In some embodiments, an animal feed for a beef cow can have a palm frond component that is greater than or equal to approximately 45% and/or less than or equal to approximately 55%. The feed can have a vegetable/fruit component that is greater than or equal to approximately 20% and/or less than or equal to approximately 30%. The feed can have a sugar component that is greater than or equal to approximately 20% and/or less than or equal to approximately 30%. In some embodiments, the feed can also have varying amounts of a roughening component.

In some embodiments, an animal feed for a beef cow can have a palm frond component that is approximately 50%. The feed can have a vegetable/fruit component that is approximately 25%. The feed can have a sugar component that is approximately 25%. In some embodiments, the feed can also have varying amounts of a roughening component.

Palm Frond and Palm Fruit Base Feeds

Figure 7:
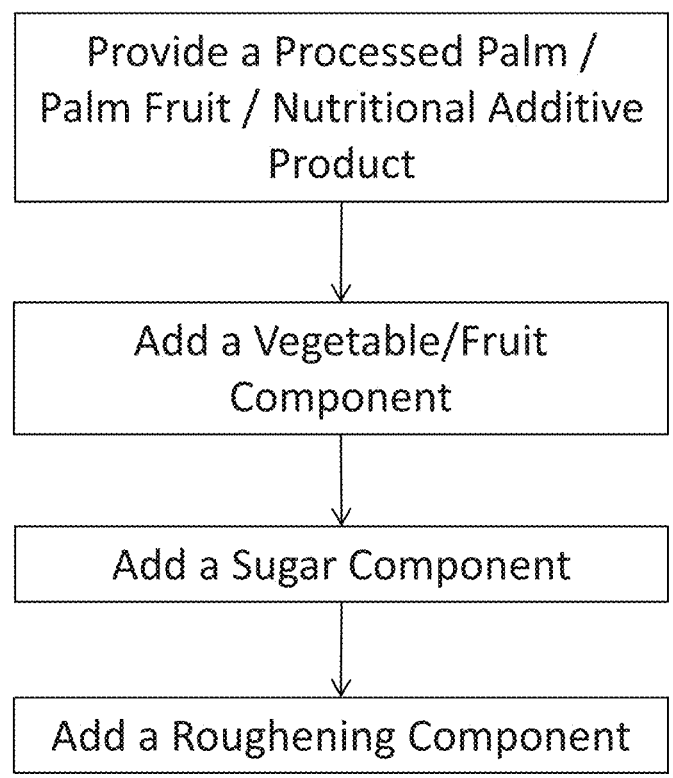
FIG. 7 is a block diagram of one embodiment of a method of preparing an animal feed.

As illustrated in FIG. 7, in some embodiments, animal feeds described herein that include a combination of a palm frond component and a palm fruit component (including embodiments with nutritional additives, such as, for example, urea) can form a base for animal feed that can replace other bases, such as alfalfa. The combined palm frond/fruit base can be in any form described above, including as loose feed, feed prepared into cubes, feed prepared into other shapes, etc. As above, the particular ratios can vary depending on the type of animal, though the various ratios described can be used for a variety of different animals. Also, as above, the various ratios described below are understood to in some embodiments describe ratios of pre-mixed volumes and in other embodiments describe ratios by weight.

In some embodiments, an animal feed for a dairy cow can have a palm frond/fruit base that is greater than or equal to approximately 70% and/or less than or equal to approximately 90%. The feed can have a vegetable/fruit component that is greater than or equal to approximately 5% and/or less than or equal to approximately 15%. The feed can have a sugar component that is greater than or equal to approximately 5% and/or less than or equal to approximately 15%. In some embodiments, the feed can also have varying amounts of a roughening component.

In some embodiments, an animal feed for a dairy cow can have a palm frond/fruit base that is greater than or equal to approximately 75% and/or less than or equal to approximately 85%. The feed can have a vegetable/fruit component that is greater than or equal to approximately 7% and/or less than or equal to approximately 13%. The feed can have a sugar component that is greater than or equal to approximately 7% and/or less than or equal to approximately 13%. In some embodiments, the feed can also have varying amounts of a roughening component.

In some embodiments, an animal feed for a dairy cow can have a palm frond/fruit base that approximately 80%. The feed can have a vegetable/fruit component that is approximately 10%. The feed can have a sugar component that is approximately 10%. In some embodiments, the feed can also have varying amounts of a roughening component.

In some embodiments, an animal feed for a beef cow can have a palm frond/fruit base that is greater than or equal to approximately 40% and/or less than or equal to approximately 70%. The feed can have a vegetable/fruit component that is greater than or equal to approximately 20% and/or less than or equal to approximately 40%. The feed can have a sugar component that is greater than or equal to approximately 5% and/or less than or equal to approximately 15%. In some embodiments, the feed can also have varying amounts of a roughening component.

In some embodiments, an animal feed for a beef cow can have a palm frond/fruit base that is greater than or equal to approximately 45% and/or less than or equal to approximately 60%. The feed can have a vegetable/fruit component that is greater than or equal to approximately 25% and/or less than or equal to approximately 35%. The feed can have a sugar component that is greater than or equal to approximately 7% and/or less than or equal to approximately 13%.

In some embodiments, the feed can also have varying amounts of a roughening component.

In some embodiments, an animal feed for a beef cow can have a palm frond/fruit base that approximately 50%. The feed can have a vegetable/fruit component that is approximately 30%. The feed can have a sugar component that is approximately 10%. In some embodiments, the feed can also have varying amounts of a roughening component.

General Base Feeds

Figure 8:
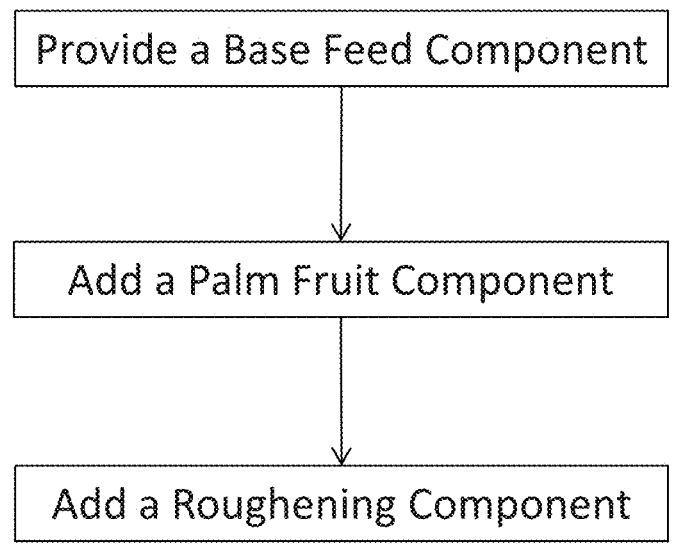
FIG. 8 is a block diagram of one embodiment of a method of preparing an animal feed.

In some embodiments, palm fruit and/or seeds can be added to different types of feed or feed bases, including, for example, alfalfa, soy, corn, wheat, hay, grass, and other silage. Palm fruit combined according to any of the ratios described herein, or in other suitable ratios, with a nutritional additive, such as urea and/or wheat, can also be added to other types of feeds or components of feeds, such as, for example, alfalfa, soy, corn, hay, grass, and other silage. Because of the particular nutritional qualities of palm fruit, in some embodiments palm fruit can serve as both a vegetable/fruit component and a sugar component as part of the various ratios discussed above. For example, a palm fruit contains a high energy content and can be substituted for corn, for example, in some feed applications. Additionally, some palm fruits, such as dates, include pits, which can provide a roughening component in some embodiments. FIG. 8 illustrates an example of a feed with a palm fruit component that serves as both a vegetable/fruit component and a sugar component.

Figure 9:
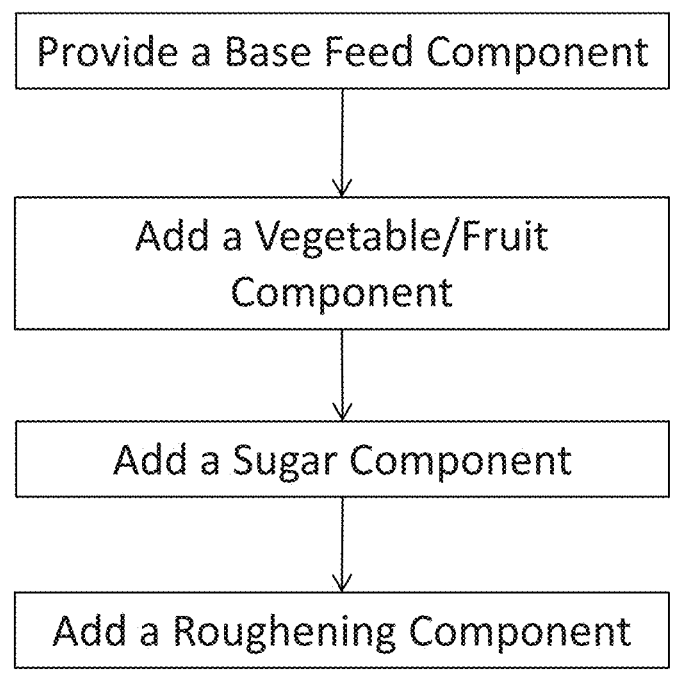
FIG. 9 is a block diagram of one embodiment of a method of preparing an animal feed.

In some embodiments, an animal feed can have a base feed component including one or more types of base feeds, such as palm frond, alfalfa, soy, corn, wheat, hay, grass, and/or other silage components, forming the base feed component. FIG. 9 illustrates an example of a base feed component mixed with a vegetable/fruit component, a sugar component, and a roughening component. In some embodiments, an animal feed can have a base feed component that is greater than or equal to approximately 50% and/or less than or equal to approximately 90%. The feed can have a roughening component that is greater than or equal to approximately 2% and/or less than or equal to approximately 10%. The feed can have a vegetable/fruit component that is greater than or equal to approximately 10% and/or less than or equal to approximately 20%. The feed can have a sugar component that is greater than or equal to approximately 5% and/or less than or equal to approximately 15%. These ratios, the various ratios described below, are understood to in some embodiments describe ratios of pre-mixed volumes and in other embodiments describe ratios by weight.

In some embodiments, an animal feed can have a base feed component that is greater than or equal to approximately 60% and/or less than or equal to approximately 80%. The feed can have a roughening component that is greater than or equal to approximately 3% and/or less than or equal to approximately 7%. The feed can have a vegetable/fruit component that is greater than or equal to approximately 13% and/or less than or equal to approximately 17%. The feed can have a sugar component that is greater than or equal to approximately 8% and/or less than or equal to approximately 12%.

In some embodiments, an animal feed can have a base feed component that is approximately 70%. The feed can have a roughening component that is 5%. The feed can have a vegetable/fruit component that is approximately 15%. The feed can have a sugar component that is approximately 10%.

In some embodiments, an animal feed can have a base feed component that is greater than or equal to approximately 40% and/or less than or equal to approximately 60%. The feed can have a vegetable/fruit component that is greater than or equal to approximately 15% and/or less than or equal to approximately 35%. The feed can have a sugar component that is greater than or equal to approximately 15% and/or less than or equal to approximately 35%. In some embodiments, the feed can also have varying amounts of a roughening component.

In some embodiments, an animal feed can have a base feed component that is greater than or equal to approximately 45% and/or less than or equal to approximately 55%. The feed can have a vegetable/fruit component that is greater than or equal to approximately 20% and/or less than or equal to approximately 30%. The feed can have a sugar component that is greater than or equal to approximately 20% and/or less than or equal to approximately 30%. In some embodiments, the feed can also have varying amounts of a roughening component.

In some embodiments, an animal feed can have a base feed component that is approximately 50%. The feed can have a vegetable/fruit component that is approximately 25%. The feed can have a sugar component that is approximately 25%. In some embodiments, the feed can also have varying amounts of a roughening component.

In some embodiments, an animal feed can have a base feed component that is greater than or equal to approximately 50% and/or less than or equal to approximately 90%. The feed can have a roughening component that is greater than or equal to approximately 2% and/or less than or equal to approximately 10%. The feed can have a palm fruit component, such as dates, that is greater than or equal to approximately 2% and/or less than or equal to approximately 50%.

In some embodiments, an animal feed can have a base feed component that is greater than or equal to approximately 60% and/or less than or equal to approximately 80%. The feed can have a roughening component that is greater than or equal to approximately 3% and/or less than or equal to approximately 7%. The feed can have a palm fruit component, such as dates, that is greater than or equal to approximately 5% and/or less than or equal to approximately 40%.

In some embodiments, an animal feed can have a base feed component that is approximately 70%. The feed can have a roughening component that is 5%. The feed can have a palm fruit component, such as dates, that is 25%.

In some embodiments, an animal feed can have a base feed component that is greater than or equal to approximately 40% and/or less than or equal to approximately 60%. The feed can have a palm fruit component, such as dates, that is greater than or equal to approximately 10% and/or less than or equal to approximately 45%. In some embodiments, the feed can also have varying amounts of a roughening component.

In some embodiments, an animal feed can have a base feed component that is greater than or equal to approximately 45% and/or less than or equal to approximately 55%. The feed can have a palm fruit component, such as dates, that is greater than or equal to approximately 15% and/or less than or equal to approximately 35%. In some embodiments, the feed can also have varying amounts of a roughening component.

In some embodiments, an animal feed can have a base feed component that is approximately 50%. The feed can have a palm fruit component, such as dates, that is approximately 30%. In some embodiments, the feed can also have varying amounts of a roughening component.

The terms "approximately", "about", and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

Similarly, this method of disclosure is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A processed palm feed, comprising:
a mixture of ground palm fronds, ground palm dates, and at least one nutritional additive forming a feed mixture; wherein the feed mixture comprises greater than or equal to 40% by weight of the feed mixture of the ground palm fronds, wherein the feed mixture comprises between about 10% and about 45% by weight of the feed mixture of the ground palm dates, wherein the feed mixture comprises at least about 5% by weight of the feed mixture of the at least one nutritional additive, and wherein the feed mixture has a nutritional content of between about 10% and about 20% protein by weight of the feed mixture, between about 2% and about 5% fat by weight of the feed mixture, and between about 20% and about 30% fiber by weight of the feed mixture.

2. The feed of claim 1, wherein the ground palm fronds and the ground palm dates have a ratio by weight of 5:1 to 1:1.

3. The feed of claim 1, wherein the feed mixture comprises a moisture content of between 10% and 14% by weight of the feed mixture.

4. The feed of claim 1, wherein the feed mixture is compressed as pellets comprising the ground palm fronds, the ground palm dates, and the at least one nutritional additive.

5. The feed of claim 1, wherein the feed mixture comprises at least about 20% by weight of the feed mixture of the at least one nutritional additive.

6. The feed of claim 1, wherein the feed mixture comprises between about 20% and about 40% by weight of the feed mixture of the at least one nutritional additive.

7. The feed of claim 1, wherein the ground palm fronds and the ground palm dates together comprise up to about 70% by weight of the feed mixture.

8. The feed of claim 1, wherein at least a portion of the ground palm fronds and at least a portion of the ground palm dates are from Canary palms.

9. The feed of claim 1, wherein at least a portion of the ground palm dates are from Deglet Noor palms.

10. The feed of claim 1, wherein the feed mixture comprises between about 5% and about 40% by weight of the feed mixture of the at least one nutritional additive.

11. The feed of claim 1, wherein the at least one nutritional additive is a grain.

12. The feed of claim 1, wherein the at least one nutritional additive is wheat.

13. The feed of claim 1, wherein at least a portion of the ground palm fronds are from *Washingtonia robusta* palms.

14. The feed of claim 1, wherein at least a portion of the ground palm fronds are from *Washingtonia filifera* palms.

15. The feed of claim 1, wherein at least a portion of the ground palm fronds are from *Phoenix dactylifera* palms.

16. The feed of claim 1, wherein at least a portion of the ground palm fronds are from *Phoenix canariensis* palms.

17. The feed of claim 1, wherein at least a portion of the ground palm dates are from *Washingtonia robusta* palms.

18. The feed of claim 1, wherein at least a portion of the ground palm dates are from *Washingtonia filifera* palms.

19. The feed of claim 1, wherein at least a portion of the ground palm dates are from *Phoenix dactylifera* palms.

20. The feed of claim 1, wherein at least a portion of the ground palm dates are from *Phoenix canariensis* palms.

* * * * *